US 8,558,505 B2

(12) United States Patent
Iwata

(10) Patent No.: US 8,558,505 B2
(45) Date of Patent: Oct. 15, 2013

(54) SHARING CHARGING SYSTEM

(75) Inventor: Yasuki Iwata, Kariya (JP)

(73) Assignee: Kabushiki Kaisha Toyota Jidoshokki, Aichi (JP)

( * ) Notice: Subject to any disclaimer, the term of this patent is extended or adjusted under 35 U.S.C. 154(b) by 152 days.

(21) Appl. No.: 13/207,618

(22) Filed: Aug. 11, 2011

(65) Prior Publication Data

US 2012/0056582 A1    Mar. 8, 2012

(30) Foreign Application Priority Data

Sep. 3, 2010  (JP) ................................ 2010-197665

(51) Int. Cl.
*H02J 7/00*       (2006.01)
*B60K 1/00*       (2006.01)
*B60L 1/00*       (2006.01)

(52) U.S. Cl.
USPC ................ 320/109; 180/65.1; 104/34; 191/2; 191/3; 191/4; 191/5; 191/6; 191/7; 191/8; 307/10.1; 307/10.7

(58) Field of Classification Search
CPC ............................ Y02T 90/14; A61G 2203/14
USPC ......................................... 320/109; 180/65.1
See application file for complete search history.

(56) References Cited

U.S. PATENT DOCUMENTS

| | | | |
|---|---|---|---|
| 7,531,984 B2* | 5/2009 | Freed et al. ................... | 320/109 |
| 7,768,229 B2* | 8/2010 | Zhang et al. .................. | 320/104 |
| 7,906,937 B2* | 3/2011 | Bhade et al. .................. | 320/109 |
| 2010/0134067 A1* | 6/2010 | Baxter et al. .................. | 320/109 |
| 2010/0274697 A1* | 10/2010 | Zyren .............................. | 705/34 |
| 2011/0258112 A1* | 10/2011 | Eder et al. ....................... | 705/39 |
| 2011/0316482 A1* | 12/2011 | Baxter et al. .................. | 320/109 |
| 2012/0019203 A1* | 1/2012 | Kressner ....................... | 320/109 |

FOREIGN PATENT DOCUMENTS

| | | |
|---|---|---|
| JP | 05-336673 A | 12/1993 |
| JP | 2004-229355 A | 8/2004 |

OTHER PUBLICATIONS

JPO search results.*

* cited by examiner

*Primary Examiner* — Drew A Dunn
*Assistant Examiner* — Nathaniel Pelton
(74) *Attorney, Agent, or Firm* — Sughrue Mion, PLLC

(57) ABSTRACT

When it is determined that a charge controllable vehicle and a charge uncontrollable vehicle coexist are connected to a plurality of charging stations, available power X is distributed and supplied to the charge controllable vehicle or the charge uncontrollable vehicle so that total power derived from the charge controllable vehicle and the charge uncontrollable vehicle does not exceed the available power X of a power supply unit, and the available power X is distributed as time division and supplied to the charge controllable vehicle and the charge uncontrollable vehicle.

3 Claims, 5 Drawing Sheets

SHARING CHARGING SYSTEM

FIELD

The present invention relates to a sharing charging system for supplying power to a plurality of vehicles from one power receiving facility.

BACKGROUND

There is a sharing charging system which, for example, supplies battery charging power from one power receiving facility to a plurality of unattended carrier (for example, refer to Japanese Laid-open Patent Publication No. 2004-229355). In the sharing charging system, the power supplied to each unattended carrier is varied so that total power supplied to unattended carriers does not exceed the maximum available power.

There is another sharing charging system which, for example, supplies battery charging power from one power receiving facility to a plurality of electric vehicles (for example, refer to Japanese Laid-open Patent Publication No. 5-336673). The sharing charging system supplies power to each electric vehicle in a time-division manner.

However, in any of the above-mentioned sharing charging systems, if a vehicle which is charged according to the possible power supply value transmitted from the power receiving facility and a vehicle which is charged not according to the possible power supply value transmitted from the power receiving facility coexist, the total power supplied to the vehicles may exceed the available power of the power receiving facility, and the breaker of the power receiving facility works.

SUMMARY

The present invention is to provide a sharing charging system capable of preventing the total power supplied to vehicles from exceeding the maximum available power of the charging facilities although a vehicle which is charged according to the possible power supply value transmitted from the power receiving facility and a vehicle which is charged not according to the possible power supply value transmitted from the power receiving facility coexist.

The sharing charging system according to the present invention includes a plurality of charging stations and a power receiving facility for supplying power to each of the plurality of charging stations. The power receiving facility includes a power supply unit to supply power to each of the plurality of charging stations, and a charge amount control unit to obtain a possible power supply value per vehicle based on a total number of vehicles connected to the plurality of charging stations and available power of the power supply unit when connection information indicating that a vehicle is connected is transmitted from any of the plurality of charging station, and to transmit the possible power supply value to each of the plurality of charging stations. The charging station includes a communication unit to transmit the possible power supply value transmitted from the power receiving facility to the vehicle connected to the charging station, a power measuring unit to measure the power derived from the power supply unit to the vehicle connected to the charging station, and a control unit to determine based on the power measured by the power measuring unit and the possible power supply value whether the vehicle connected to the charging station is a charge controllable vehicle which derives the power based on the possible power supply value from the power supply unit or a charge uncontrollable vehicle which derives the power not based on the possible power supply value from the power supply unit. When the charge amount control unit determines based on a determination result of the control unit of the plurality of charging stations that only the charge controllable vehicle is connected, the charge amount control unit distributes and supplies the available power of the power supply unit to each of the charge controllable vehicles. When the charge amount control unit determines based on a determination result of the control unit of the plurality of charging stations that the charge controllable vehicle and the charge uncontrollable vehicle are connected, the charge amount control unit distributes and supplies the available power of the power supply unit to the charge controllable vehicle or the charge uncontrollable vehicle so that total power derived from the charge controllable vehicle and the charge uncontrollable vehicle does not exceed the available power of the power supply unit, and distributes as time division and supplies the available power of the power supply unit to the charge controllable vehicle and the charge uncontrollable vehicle.

Thus, although there coexist a vehicle which is charged according to a possible power supply value transmitted from a power receiving facility and a vehicle which is charged not according to a possible power supply value transmitted from a power receiving facility, the total power supplied to the vehicles is prevented from exceeding the available power of the charging facilities.

The charge amount control unit can be configured such that when it determines based on the determination result of the control unit of each of the charging stations that the plurality of charge controllable vehicles and the plurality of charge uncontrollable vehicles are connected to the plurality of charging stations, the charge amount control unit repeatedly and alternately distributes and supplies the available power of the power supply unit to the plurality of charge controllable vehicles and distributes and supplies the available power of the power supply unit to the plurality of charge uncontrollable vehicles.

In addition, the charge amount control unit can be configured such that when it determines based on the determination result of the control unit of each of the charging stations that the plurality of charge controllable vehicles and the plurality of charge uncontrollable vehicles are connected to the plurality of charging stations, the charge amount control unit sequentially supplies power to each of the plurality of charge uncontrollable vehicles and distributes and supplies the remaining power after supplying the power to the charge uncontrollable vehicles in the available power of the power supply unit to the plurality of charge controllable vehicles.

DESCRIPTION OF EMBODIMENTS

Figure 1:
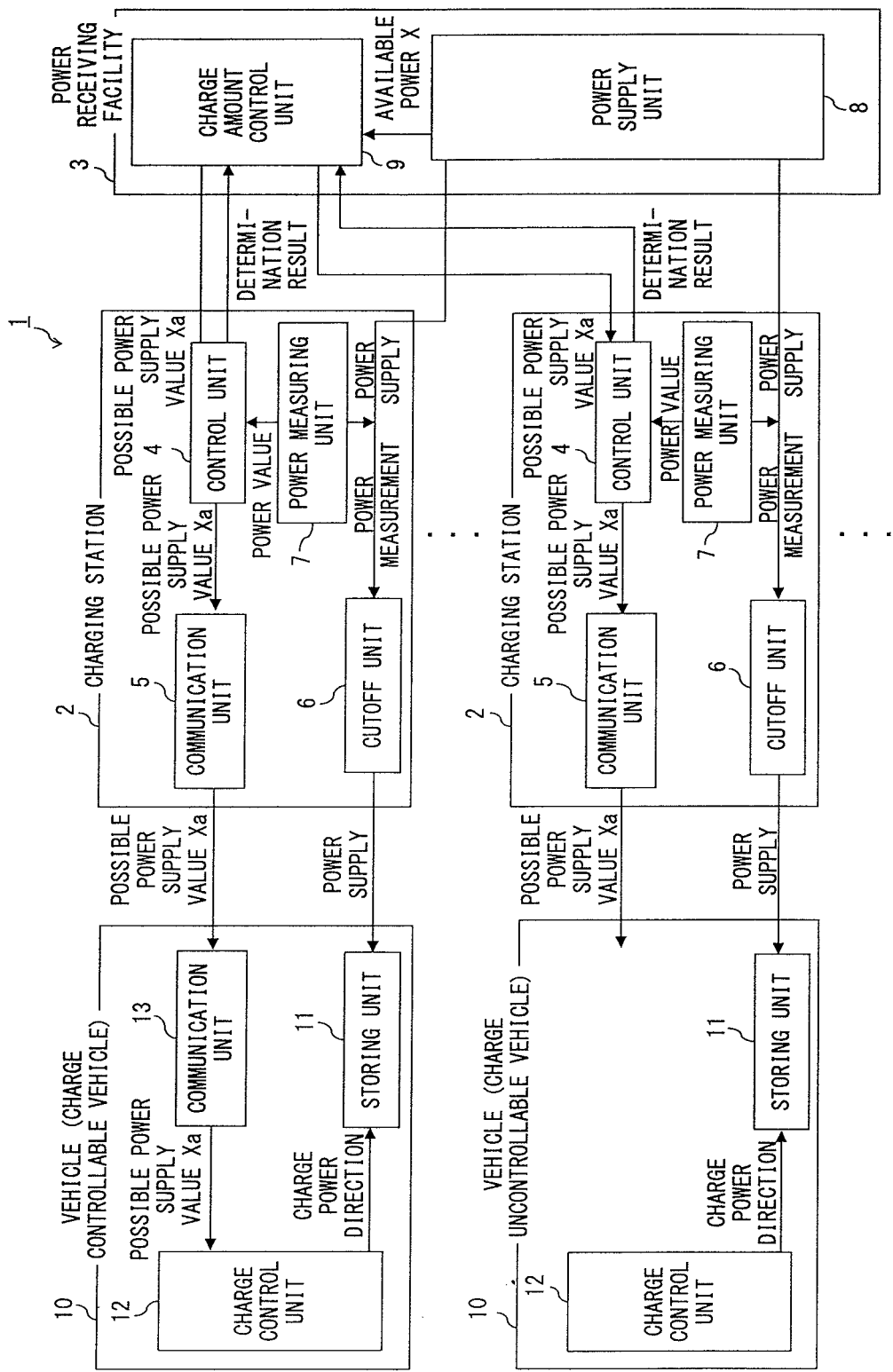
FIG. 1 illustrates a sharing charging system according to an embodiment of the present invention.

FIG. 1 illustrates a sharing charging system according to an embodiment of the present invention.

A sharing charging system 1 illustrated in FIG. 1 is configured by a plurality of charging stations 2, and a power receiving facility 3 for supplying power to each of the charging stations 2.

Each charging station 2 is configured by a control unit 4, a communication unit 5, a cutoff unit 6, and a power measuring unit 7.

The power receiving facility 3 is configured by a power supply unit 8 for supplying power to each charging station 2, and a charge amount control unit 9.

When a vehicle 10 such as an electric vehicle, a plug-in hybrid car, etc. is connected to the charging station 2 through power cable, and a charging process is started by an instruction of a user (operator), a charge control unit 12 in the vehicle 10 transmits a charge power direction to a storing unit 11 in the vehicle 10. By the storing unit 11 deriving power from the charging station 2 according to the charge power direction, power is supplied from the power supply unit 8 of the power receiving facility 3 to the storing unit 11 of the vehicle 10 through the cutoff unit 6 of the charging station 2, and the storage battery not illustrated in the attached drawings but is loaded into the vehicle 10 is charged.

The types of the vehicle 10 can be a charge controllable vehicle and a charge uncontrollable vehicle.

The charge controllable vehicle includes a communication unit 13. When the vehicle 10 is connected to the charging station 2, the communication unit 13 receives a possible power supply value Xa transmitted from the charging station 2. The communication unit 13 transmits the received possible power supply value Xa to the charge control unit 12, and the charge control unit 12 provides a charge power direction indicating the possible power supply value Xa to the storing unit 11. Thus, the storage battery of the charge controllable vehicle is charged with power depending on the possible power supply value Xa transmitted from the charging station 2. The communication units 5 and 13 can perform wireless communications or communications by cable.

The charge uncontrollable vehicle is not provided with the communication unit 13, and cannot receive the possible power supply value Xa transmitted from the charging station 2. Therefore, it cannot control the power derived by the charge uncontrollable vehicle from the charging station 2 according to the possible power supply value Xa transmitted from the charging station 2. That is, the charge uncontrollable vehicle charges the storage battery not according to the possible power supply value Xa transmitted from the charging station 2. Therefore, as described above, there is the possibility that the total power supplied to each vehicle 10 can exceed the available power X of the power receiving facility 3. For example, when the available power X of the power receiving facility 3 is 100 W, and five vehicles 10 are connected to the charging station 2, and if all of the five vehicles 10 are charge controllable vehicles, then 100 W can be distributed to charge the storage battery of each vehicle 10 with the power of 20 W. Therefore, the total power supplied to the vehicles 10 does not exceed the available power X of the power receiving facility 3. However, if one or more vehicles 10 are charge uncontrollable vehicles, and the charge uncontrollable vehicles charge the storage batteries with the power larger than 20 W, then the total power supplied to the vehicles 10 exceeds the available power X of the power receiving facility 3.

Thus, when the charge uncontrollable vehicle and the charge uncontrollable vehicle coexist and are connected to the charging station 2, the sharing charging system 1 according to the present embodiment distributes and supplies the available power X to the charge controllable vehicle or the charge uncontrollable vehicle so that the total power derived by the charge controllable vehicle and the charge uncontrollable vehicle cannot exceed the available power X of the power receiving facility 3, and distributes and supplies as time division the available power X to the charge controllable vehicle and the charge uncontrollable vehicle.

Figure 2:
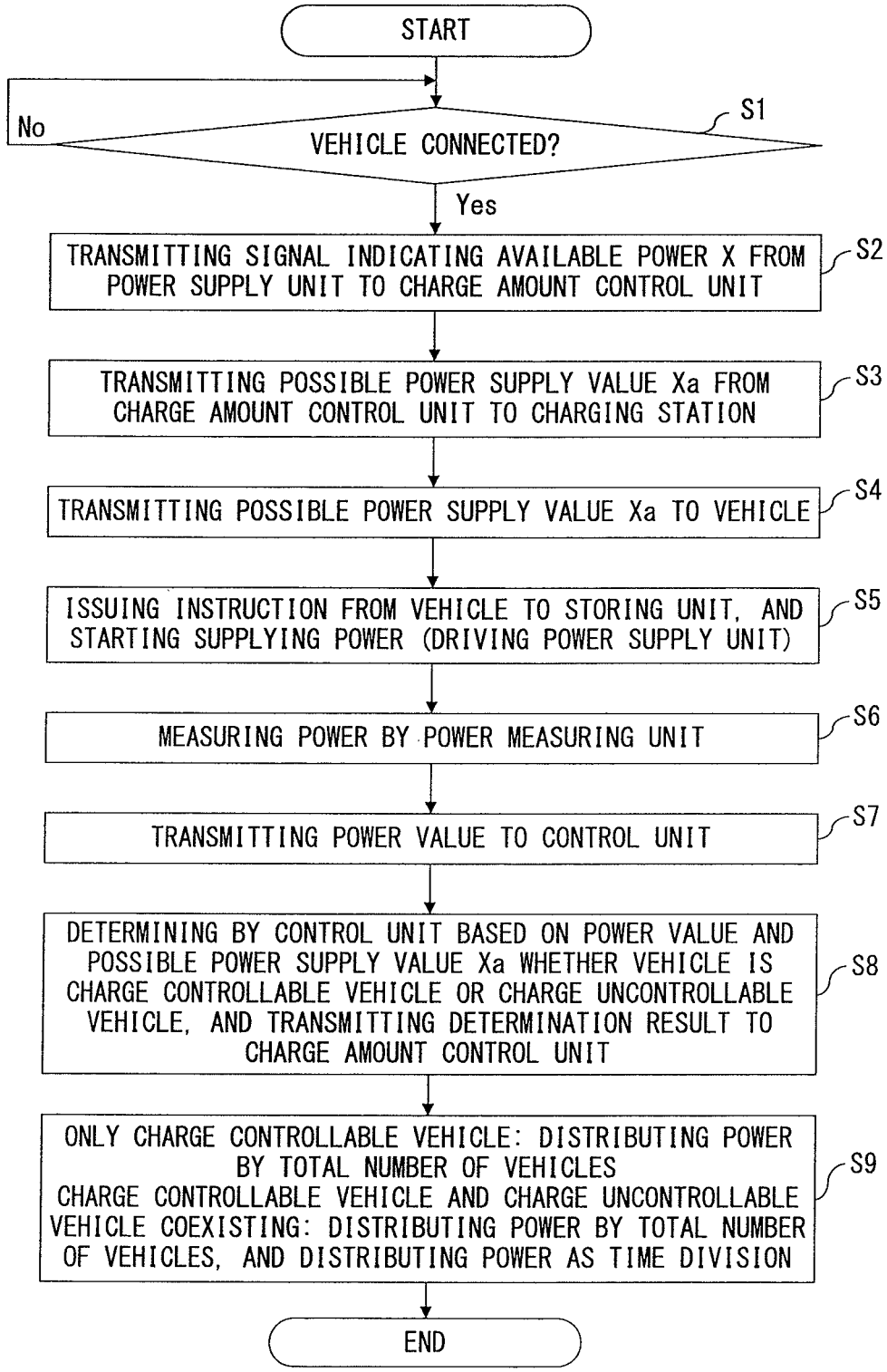
FIG. 2 is a flowchart for explanation of the operation of the sharing charging system according to an embodiment of the present invention.

FIG. 2 is a flowchart for explanation of the operation of the sharing charging system 1 when a charge controllable vehicle and a charge uncontrollable vehicle coexist and are connected to the charging station 2.

First, when a connection signal indicating that the vehicle 10 is connected to the power receiving facility 3 from any of the charging station 2 is transmitted (YES in S1), the power supply unit 8 of the power receiving facility 3 transmits a signal indicating the available power X to the charge amount control unit 9 (S2). The charge amount control unit 9 stops all power supply to each charging station 2 other than the charging station 2 to which the vehicle 10 is newly connected, divides the available power X of the power supply unit 8 by the total N of the vehicle 10 currently connected to the charging station 2, and defines the calculated result X/N as the value Xa of the power which can be supplied to one of the vehicles 10 currently connected to the charging station 2.

For example, when the available power X of the power supply unit 8 is 100 W, and five vehicles 10 are connected to each charging station 2, the possible power supply value Xa for each of the vehicles 10 is 20 W.

Next, the charge amount control unit 9 transmits the calculated possible power supply value Xa to the charging station 2 to which the vehicle 10 is newly connected (S3).

Then, the charging station 2 to which the vehicle 10 is newly connected transmits the received possible power supply value Xa to the vehicle 10 connected to the charging station 2 (S4).

Next, when the communication unit 13 is provided for the new vehicle 10, the charge control unit 12 of the vehicle 10 issues to the storing unit 11 a charge power direction indicating the storage battery is to be charged according to the received possible power supply value Xa, thereby starting charging the storage battery (S5). If no communication unit 13 is provided for the new vehicle 10, and when the vehicle 10 is connected to the charging station 2, the charge control unit 12 issues to the storing unit 11 a charge power direction indicating the storage battery is to be charged according to the power value set in advance, thereby starting charging the storage battery.

Then, the power measuring unit 7 of the charging station 2 to which the the vehicle 10 is newly connected measures the power derived from the power supply unit 8 to the vehicle 10 (S6), and the measured power is transmitted to the control unit 4 (S7).

Next, the control unit 4 determines according to the power measured by the power measuring unit 7 and the possible power supply value Xa transmitted to the vehicle 10 as to which the vehicle 10 connected to the power receiving facility 3 is, a charge controllable vehicle or a charge uncontrollable vehicle, and transmits the determination result to the charge amount control unit 9 of the power receiving facility 3 (S8).

For example, the control unit 4 can also be configured as follows. That is, when the power measured by the power measuring unit 7 is substantially equal to the possible power supply value Xa, the control unit 4 determines that the newly connected vehicle 10 is a charge controllable vehicle capable of deriving from the power supply unit 8 the power according to the possible power supply value Xa, and determines, when the power measured by the power measuring unit 7 is different from the possible power supply value Xa, that the newly connected vehicle 10 is a charge uncontrollable vehicle which derives from the power supply unit 8 the power not according to the possible power supply value Xa. When the power measured by the power measuring unit 7 is equal to or smaller than the possible power supply value Xa, the control unit 4 determines that the newly connected vehicle 10 is a charge controllable vehicle. When the power measured by the power measuring unit 7 is larger than the possible power supply value Xa, the control unit 4 determines that the newly connected vehicle 10 is a charge uncontrollable vehicle.

Then, the charge amount control unit 9 of the power receiving facility 3 supplies power to the vehicle 10 currently connected to the charging station 2 based on the determination result of the control unit 4 of the charging station 2 to which the vehicle 10 is newly connected, and the determination result of the control unit 4 of the charging station 2 to which the vehicle 10 is previously connected (S9).

Figure 3A:
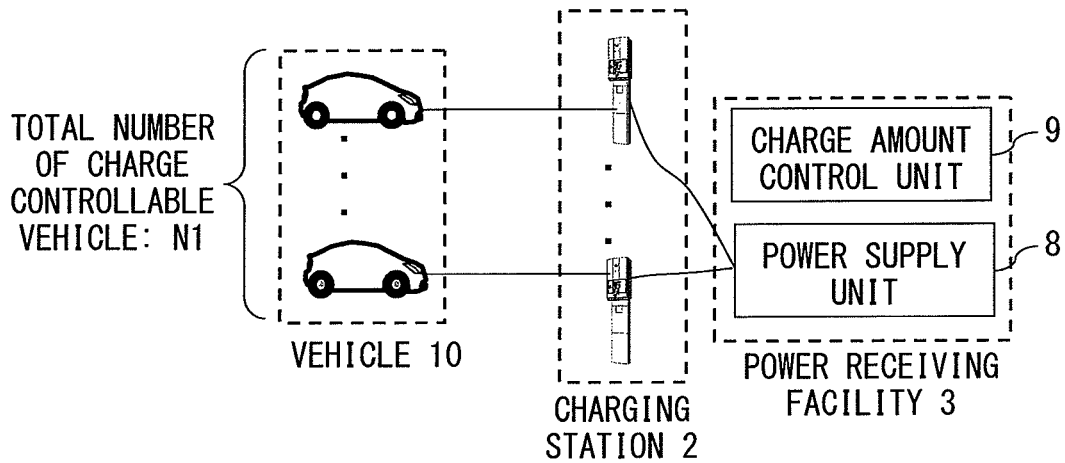
FIG. 3A illustrates a sharing charging system when only a charge controllable vehicle is connected to a charging station.

For example, when the charge amount control unit 9 determines based on each determination result that all vehicles 10 connected to each charging station 2 are charge controllable vehicles as illustrated in FIG. 3A, it divides the available power X by the total N1 of the charge controllable vehicles, defines the calculation result X/N1 as the possible power supply value Xa per vehicle, transmits the value to each charging station 2, thereby charging the storage battery of each charge controllable vehicle.

That is, when the charge amount control unit 9 determines that only charge controllable vehicles are connected to each charging station 2, it distributes and supplies the available power X to each charge controllable vehicle.

Figure 3B:
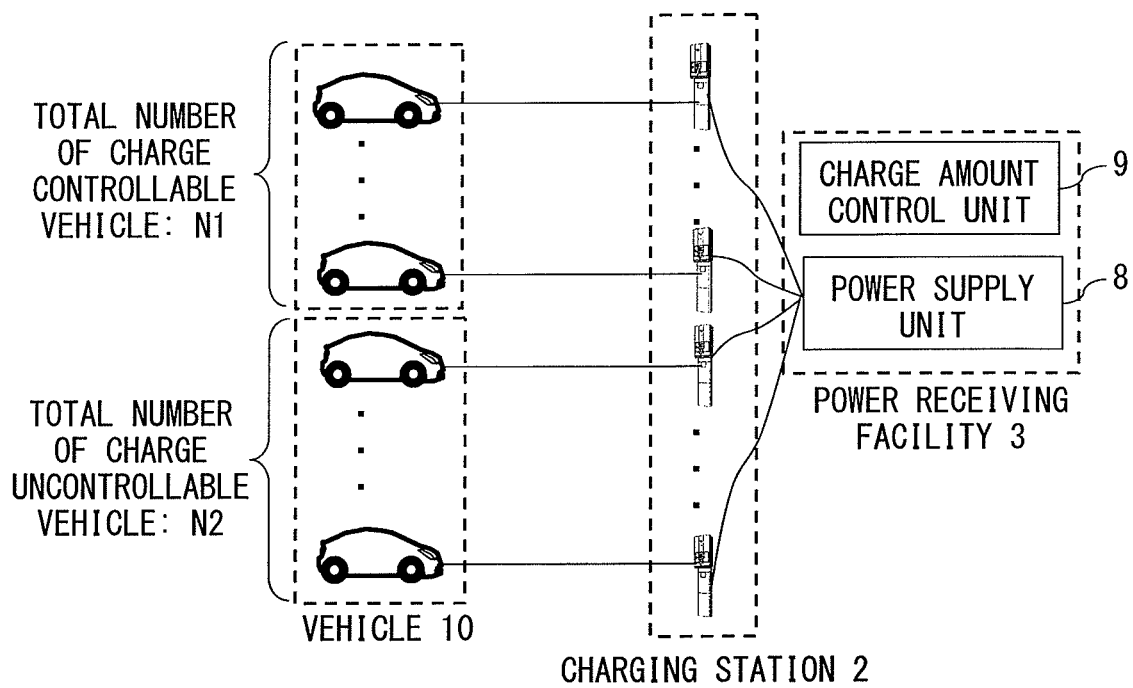
FIG. 3B illustrates a sharing charging system when a charge controllable vehicle and a charge uncontrollable vehicle coexist and are connected to a charging station.
Figure 4:
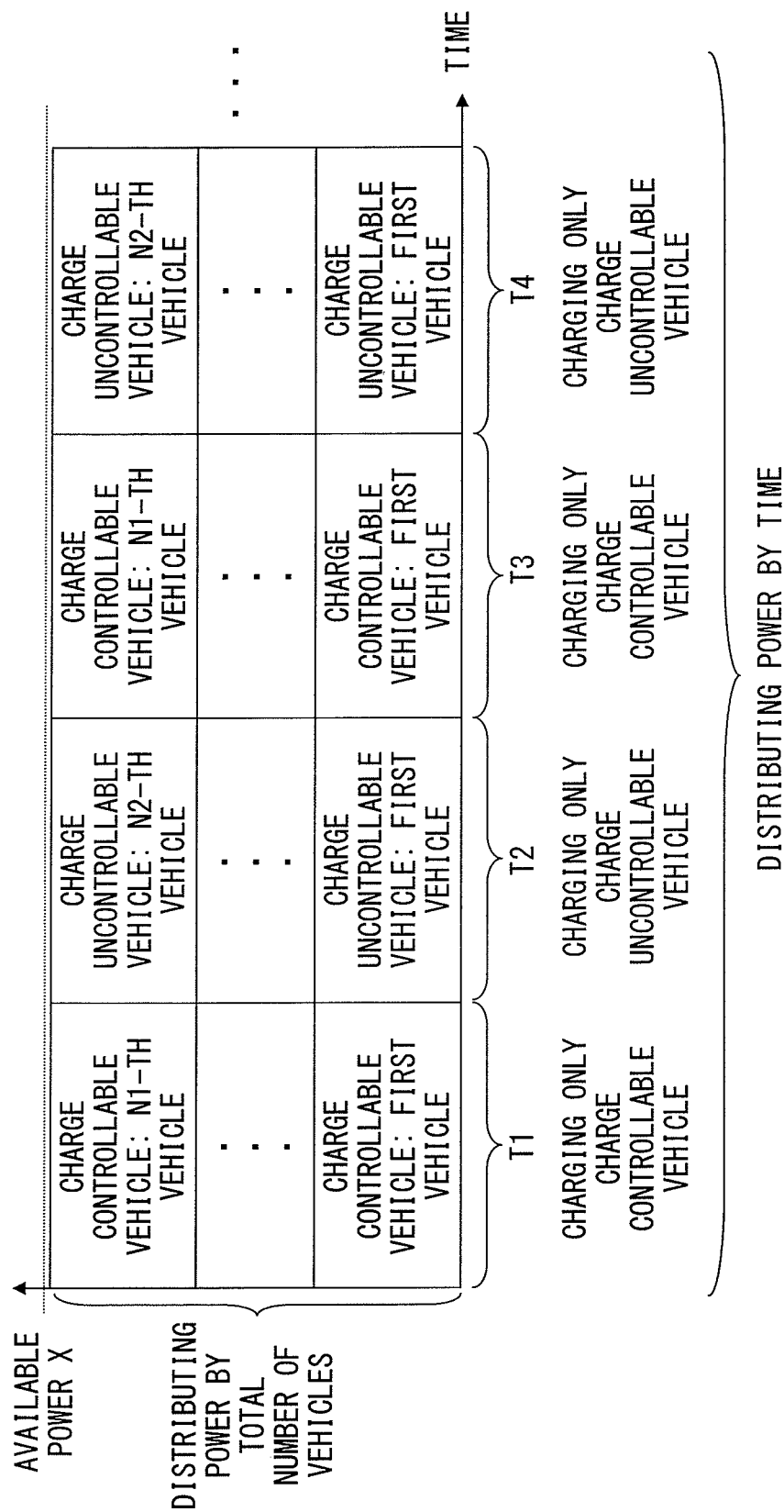
FIG. 4 is an example of a charge controlling process when a charge controllable vehicle and a charge uncontrollable vehicle coexist and are connected to a charging station.
Figure 5:
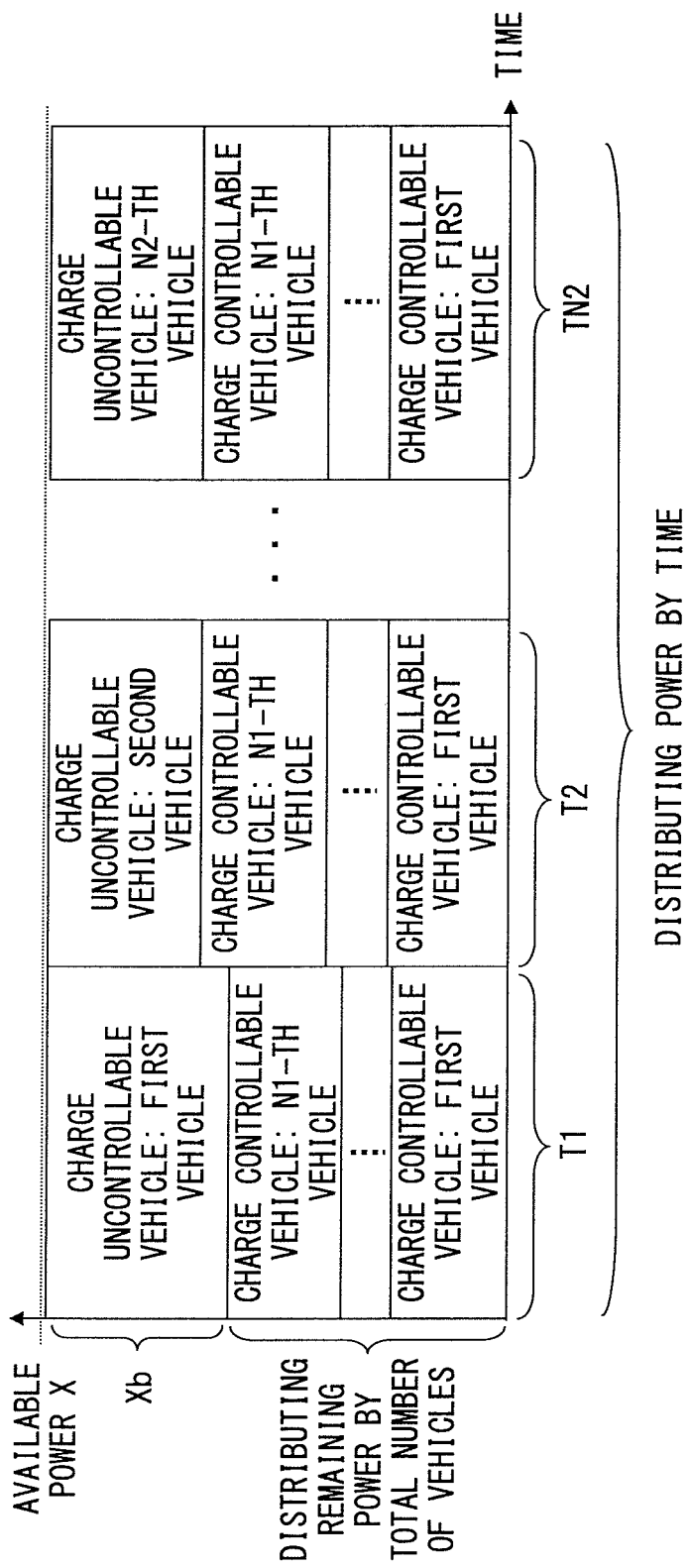
FIG. 5 is another example of a charge controlling process when a charge controllable vehicle and a charge uncontrollable vehicle coexist and are connected to a charging station.

In addition, for example, when the charge amount control unit 9 determines based on each determination result that the charge controllable vehicle and the charge uncontrollable vehicle coexist and are connected to the charging station 2 as illustrated in FIG. 3B, it repeatedly and alternately performs distributing and supplying the available power X to each charge controllable vehicle and distributing and supplying the available power X to each charge uncontrollable vehicle so that the total power derived from each charge uncontrollable vehicle does not exceed the available power X as illustrated in FIG. 4. For example, when the total power derived from N2 charge uncontrollable vehicles exceeds the available power X at time T2 as illustrated in FIG. 4, after charging the storage batteries of the charge uncontrollable vehicles of the number not exceeding the available power X in the N2 charge uncontrollable vehicles, the storage batteries of the remaining charge uncontrollable vehicles are charged in the next time T4. Furthermore, for example, when the charge amount control unit 9 determines that charge controllable vehicles and charge uncontrollable vehicles coexist and are connected to the charging station 2 as illustrated in FIG. 3B based on each determination result, it sequentially supplies the power Xb (power derived from the power supply unit 8 to each charge uncontrollable vehicle) to N2 charge uncontrollable vehicles one by one as illustrated in FIG. 5, and distributes and supplies the remaining power (X−Xb) to each charge controllable vehicle after the power Xb is supplied to the charge uncontrollable vehicles in the available power X. Before the charging operation to all storage batteries of N2 charge uncontrollable vehicles is completed, the charging operation to all storage batteries of N1 charge controllable vehicles can be completed.

That is, when the charge amount control unit 9 determines that a charge controllable vehicle and a charge uncontrollable vehicle coexist and are connected to each charging station 2, it distributes and supplies the available power X to the charge controllable vehicle and the charge uncontrollable vehicle so that the total power derived from the charge controllable vehicle and the charge uncontrollable vehicle does not exceed the available power X, and distributes as time division and supplies the available power X to the charge controllable vehicle and the charge uncontrollable vehicle.

Thus, in the sharing charging system 1 according to the present embodiment, when it is determined that a charge controllable vehicle and a charge uncontrollable vehicle coexist and are connected to each charging station 2, the available power X is distributed and supplied to the charge controllable vehicle and the charge uncontrollable vehicle so that the total power derived from the charge controllable vehicle and the charge uncontrollable vehicle does not exceed the available power X, and the available power X is distributed as time division and supplied to the charge controllable vehicle and the charge uncontrollable vehicle. Thus, although when the charge controllable vehicle and the charge uncontrollable vehicle coexist and are connected to each charging station 2, the total power supplied to each vehicle 10 can be prevented from exceeding the available power X of the power receiving facility 3.

According to the present invention, although a vehicle for charging according to a possible power supply value transmitted from a power receiving facility and a vehicle for charging not according to a possible power supply value transmitted from a power receiving facility coexist in a sharing charging system for supplying power to a plurality of vehicles from one power receiving facility, the total power supplied to each vehicle can be prevented from exceeding the maximum available power of the charging facility.

What is claimed is:

1. A sharing charging system having a plurality of charging stations and a power receiving facility for supplying power to each of the plurality of charging stations, wherein:
    the power receiving facility comprises:
        a power supply unit to supply power to each of the plurality of charging stations; and
        a charge amount control unit to obtain a possible power supply value per vehicle based on a total number of vehicles connected to the plurality of charging stations and available power of the power supply unit when connection information indicating that a vehicle is connected is transmitted from any of the plurality of charging station, and to transmit the possible power supply value to each of the plurality of charging stations;
    the charging station comprises:
        a communication unit to transmit the possible power supply value transmitted from the power receiving facility to the vehicle connected to the charging station;
        a power measuring unit to measure power derived from the power supply unit to the vehicle connected to the charging station; and
        a control unit to determine based on the power measured by the power measuring unit and the possible power supply value whether the vehicle connected to the charging station is a charge controllable vehicle which derives the power based on the possible power supply value from the power supply unit or a charge uncontrollable vehicle which derives the power not based on the possible power supply value from the power supply unit;

when the charge amount control unit determines based on a determination result of the control unit of the plurality of charging stations that only the charge controllable vehicle is connected, the charge amount control unit distributes and supplies the available power of the power supply unit to each of the charge controllable vehicles; and when the charge amount control unit determines based on a determination result of the control unit of the plurality of charging stations that the charge controllable vehicle and the charge uncontrollable vehicle are connected, the charge amount control unit distributes and supplies the available power of the power supply unit to the charge controllable vehicle or the charge uncontrollable vehicle so that total power derived from the charge controllable vehicle and the charge uncontrollable vehicle does not exceed the available power of the power supply unit, and distributes as time division and supplies the available power of the power supply unit to the charge controllable vehicle and the charge uncontrollable vehicle.

2. The sharing charging system according to claim 1, wherein when the charge amount control unit determines based on the determination result of the control unit of each of the charging stations that the plurality of charge controllable vehicles and the plurality of charge uncontrollable vehicles are connected to the plurality of charging stations, the charge amount control unit repeatedly and alternately distributes and supplies the available power of the power supply unit to the plurality of charge controllable vehicles and distributes and supplies the available power of the power supply unit to the plurality of charge uncontrollable vehicles.

3. The sharing charging system according to claim 1, wherein when the charge amount control unit determines based on the determination result of the control unit of each of the charging stations that the plurality of charge controllable vehicles and the plurality of charge uncontrollable vehicles are connected to the plurality of charging stations, the charge amount control unit sequentially supplies power to each of the plurality of charge uncontrollable vehicles and distributes and supplies the remaining power after supplying the power to the charge uncontrollable vehicles in the available power of the power supply unit to the plurality of charge controllable vehicles.

* * * * *